Patented July 13, 1937

2,086,854

UNITED STATES PATENT OFFICE 2,086,854

METALLIZED ACID AZO DYES

Moses Leverock Crossley, Plainfield, and Lincoln Maurice Shafer, Highland Park, N. J., assignors to Calco Chemical Company, Inc., Bound Brook, N. J., a corporation of Delaware No Drawing. Application July 7, 1933,
Serial No. 679,398

7 Claims. (Cl. 260—11)

This invention relates to new metallized azo dyes suitable for the production of fast colors on animal fibers.

It is known that chromium derivatives of the azo dyes formed by coupling nitro-ortho-diazophenols with naphthol sulfonic acids can be produced by boiling these dyes with chromium compounds and then salting out the resulting products. We have discovered that new and valuable water soluble metallized dyes containing metal in stable combination, that is, in a form such that it is not precipitated by inorganic bases result when ortho-hydroxyphenyl-azo-naphthols containing at least one salt-forming group, such as $SO_3H$ or $COOH$, and having a pair of metallizable groups ortho to the azo group are metallized with salts or other suitable compounds of iron, manganese, cobalt, nickel, vanadium, titanium and zirconium and combinations of chromium and these metals. By a "pair of metallizable groups" is meant two such groups, as hydroxyl, ortho to the azo group, one of the pair being on the phenyl nucleus and the other on the naphthyl nucleus.

The products comprising the present invention may be characterized by the following general formula—

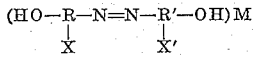

wherein R is a phenyl nucleus, R' is a naphthyl nucleus, X is halogen, $NO_2$, $SO_3H$ and $COOH$, X' is $SO_3H$ or $COOH$, and the OH groups are ortho to the azo group. M represents one or more metals of the group set forth above and the number of metal atoms to each molecule of dye may vary from a fraction to several such atoms.

The products formed with these metals are particularly valuable for the rich tones of fast colors they produce when dyed on animal fibers in a bath containing acid. The variety of tones of color can be greatly increased by using mixtures of the above metals, thus producing complex metallized dyes containing two or more metals. Combinations particularly suitable for producing desirable results are: Chromium-copper, chromium-iron, nickel-vanadium, and copper-iron. The dyes obtained with the combination of metals are different in tone and superior in fastness to mechanical mixtures of the individual dyes metallized with the single metals in the combinations.

The ratio of the metal or metal complex to the dye may vary within wide limits, depending upon the nature of the metal and the nature and number of metallized groups in the dye molecule.

The products of this invention are formed by refluxing the known azo dyes formed from ortho-aminophenols and their substitution products, coupled with naphthol sulfonic or carboxylic acids, with salts or other suitable compounds of the above metals and mixtures of metals. The dyes are salted out with sodium chloride or ammonium sulphate, filtered and dried. Substituted ortho-aminophenols, such as 4-nitro-2-aminophenol, 4-sulfo-2-aminophenol are diazotized and coupled in alkaline solution with naphthols, such as beta naphthol sulfonic acids, beta naphthol 3-carboxylic acid, 2-naphthol-4,5-dicarboxylic acid, and 1-naphthol-5-sulfonic acid. The resulting dyes are salted out, filtered, redissolved or suspended in water and treated with a metallizing agent. The metallizing agent may be a water soluble salt of the metal or an insoluble freshly prepared hydrate of the metal, and the metallization may be accomplished with or without the aid of solubilizing agents for the metallic compounds. In any case soluble metallized dyes are produced. These are salted out of the solution with sodium chloride or ammonium sulfate, filtered and dried. The dyes thus produced are dark colored powders which are quite soluble in water. They dye animal fibers fast tones of black and varied colors. The metal is bound firmly in the dye molecule and is not precipitated when aqueous solutions of the dyes are treated with inorganic bases.

The following examples are given to illustrate the invention. It must be understood that they do not limit its scope. The parts given are by weight.

Example 1

Dissolve 21 parts of the sodium salt of 2-naphthol-6-sulfonic acid (Schaeffer salt) and 2 parts of caustic soda in 440 parts of water. Heat the mixture to about 40° C. to insure complete solution. Adjust the solution with acid or caustic until it is just slightly alkaline to phenolphthalein paper. Then add 6 parts of hydrated lime and cool the mixture to between 13° and 15° C. Suspend 12 parts of 4-nitro-2-aminophenol in 200 parts of water. Add 18 parts of concentrated hydrochloric acid. Heat to about 40° C. to insure complete solution. Cool the mixture to 10° C. with ice. Diazotize with 5.5 parts of sodium nitrite. When diazotization is complete, neutralize the excess of acid with sodium bicarbonate solution. Couple the diazo with the Schaeffer salt solution, stir the mixture until coupling is complete, then add 11.5 parts of concentrated hydrochloric acid and salt out with sodium chloride equivalent to about 20% of the volume of the solution. Heat to 90° C. The reaction should be slightly acid to Congo red. Filter and re-suspend the paste in 1000 parts of water, add 10.5 parts of sodium acetate. Heat the mixture to 60° C. and then add a solution of 15.5 parts of ferrous sulfate crystals in 30 parts of hot water. Heat the mixture and boil for about ten minutes. Add salt equivalent to 5% of the volume of the solution. Filter off the dye and dry it. The dye obtained is a dark brown powder which is soluble in water and produces on animal fibers dark tones of brown of excellent fastness to light.

The Schaeffer salt may be replaced by other soluble salts of naphthol sulfonic acids such as R acid, N. W. acid, etc. and the iron may be substituted by copper, manganese, nickel, cobalt, vanadium, titanium, zirconium, or by combinations of these, and dyes obtained which produce on animal fibers varied tones of brown to red of good to excellent fastness to light and washing.

Example 2

Dissolve 15.2 parts of 2-aminophenol-4-sulfonic acid in 200 parts of water, add 18 parts of concentrated hydrochloric acid, cool the solution to about 10° C., diazotize with 5.5 parts of sodium nitrite. Neutralize the excess acid with sodium bicarbonate solution, then add the diazo solution to a solution containing 21 parts of Schaeffer salt and 2 parts of caustic soda and 8 parts soda ash in 450 parts of water, having previously cooled the solution to about 10° to 15° C. Stir the mixture until the coupling is complete, then add 11.5 parts of concentrated hydrochloric acid and salt out the dye with ammonium sulfate, filter, suspend the paste in 1000 parts of water, add 10.5 parts of sodium acetate, heat to 60° C., add a solution of 15.5 parts of ferrous sulfate crystals in 30 parts of hot water. Heat the mixture to the boil and then boil for about ½ hour. Salt out the dye with ammonium sulfate and sulfuric acid, filter and dry it. A dark colored powder is obtained which dissolves readily in water and dyes animal fibers a dark brown color of excellent fastness.

The iron may be substituted by copper, manganese, cobalt, nickel, vanadium, titanium and zirconium, or mixtures of these, and products obtained which produce on animal fibers varied tones of brown to red of good to excellent fastness.

Example 3

Dissolve 27 parts of 4-nitro-2-aminophenol-6-sulfonic acid in 350 parts of water, add 27 parts of concentrated hydrochloric acid of 20° Bé., and heat to insure complete solution. Cool the solution to about 10° C., and diazotize with 8.5 parts of sodium nitrite. Add the diazo solution to a solution containing 19 parts of beta-hydroxynaphthoic acid, 5 parts of sodium hydroxide and 14 parts soda ash and 500 parts of water, the solution having previously been cooled to about 10° C. with ice. Stir the mixture until coupling is complete. Salt out the dye with sodium chloride, filter, and suspend the filter cake in 1000 parts of water. Add 20 parts of sodium acetate, heat the mixture to 60° C., then add 35 parts of copper sulfate crystals, boil the solution for several hours, salt out the dye with sodium chloride, filter, and dry. The resulting product is a dark colored powder, soluble in water, and dyes animal fibers fast tones of red.

The copper may be substituted by chromium, iron, manganese, cobalt, nickel, vanadium, titanium and zirconium, or mixtures of these, and similar dyes are obtained, which are capable of producing on animal fibers varied tones of brown, red and black of good to excellent fastness.

Example 4

Dissolve 23 parts of 4-sulfo-2-aminophenol in 350 parts of water, add 27 parts of concentrated hydrochloric acid of 20° Bé., cool to about 8° C. and diazotize with 8.5 parts of sodium nitrite. Add the diazo solution to a solution previously cooled to about 10° C. and containing 31.5 parts of the anilide of beta-hydroxynaphthoic acid (naphthol AS) and 10 parts of sodium hydroxide. Stir the mixture until coupling is complete. Salt out the dye, filter it, and suspend the paste in about 1000 parts of water. Add 20 parts of sodium acetate and 30 parts of copper sulfate crystals. Boil the mixture for several hours, salt out the resulting dye, filter, and dry it. The product is a dark colored powder quite soluble in water and dyes animal fibers dark tones of red of excellent fastness to light.

Copper may be replaced by chromium, iron, manganese, cobalt, nickel, vanadium, titanium and zirconium, or mixtures of these, and similar products obtained which are capable of dyeing animal fibers varied tones of red, brown and violet of good to excellent fastness to light.

Example 5

Suspend 20 parts of picramic acid in 200 parts of water, add 18 parts of concentrated hydrochloric acid, cool the solution to 10° C., diazotize with 7 parts of sodium nitrite, add the diazo to a previously cooled solution containing 23 parts of 2-naphthol-6-sulfonic acid and 4 parts of caustic soda and 10 parts of hydrated lime in 500 parts of water. Stir until coupling is complete. Acidify with hydrochloric acid. Salt out the dye with sodium chloride, filter, redissolve it in about 1000 parts of water, add 12 parts of sodium acetate, heat to 60° C. and then add a solution of 16 parts of ferrous sulfate crystals in 35 parts of water. Boil, then salt out the dye with sodium chloride, filter it, and dry it. A dark colored powder is obtained which dyes animal fibers dark tones of greenish brown of excellent fastness to light.

Example 6

0.08 of a mole of the dye obtained by coupling the diazo compound obtained from 4-nitro-2-aminophenol with Schaeffer salt is dissolved in water and treated with 8 parts of vanadium tetrachloride and 11 parts of chromous sulfate crystals. All about 11 parts of sodium acetate. Boil the mixture for about 2 hours, salt out the dye with sodium chloride, filter and dry. The dye obtained is a dark brown powder which is soluble in water and produces on animal fibers brownish black shades of excellent fastness.

The vanadium and chromium salts can be replaced by any one of the following combinations:

a. Cobaltous acetate 10 parts and chromous sulfate 11 parts.

b. Chromous sulfate crystals 11 parts and ferrous sulfate crystals 11 parts.

c. Copper sulfate crystals 10 parts and vanadium tetrachloride 8 parts.

In these cases dark brown products are obtained which dye animal fibers deep brown tones of excellent fastness.

Although we have described our invention setting forth a few specific examples of the products coming within the scope thereof, it is to be understood that the examples were given for the purpose of illustration and they do not define the limits of the invention. Many dyes of various chemical constitutions and of various colors and shades may be made by variations in the ingredients used, the conditions of the reaction, the number and nature of the metals, and the like, within the spirit of the invention.

These and other variations may be made in our invention, the scope of which is set forth in the claims appended hereto.

We claim:

1. As new products, metallized dyes having the following structural formula:

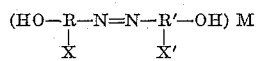

wherein R is a phenyl nucleus, R' is a naphthyl nucleus, X is one of the following group consisting of hydrogen, halogen, $NO_2$, $SO_3H$ and COOH, X' is a member of the group consisting of hydrogen, $SO_3H$ and COOH, the OH groups are ortho to the azo groups and M is at least one metal taken from the group consisting of iron, manganese, vanadium, titanium, zirconium.

2. Products in accordance with claim 1 in which X is hydrogen and X' is a group included in the group consisting of $SO_3H$, COOH.

3. Products in accordance with claim 1 in which X' is hydrogen and X is a group included in the group consisting of $SO_3H$, COOH.

4. Products in accordance with claim 1 in which the number of metal atoms varies from a fraction to several such atoms per dye molecule.

5. As new products, metallized dyes derived from ortho-hydroxy-phenyl azo naphthols containing at least one salt forming group and having a pair of metallizable groups ortho to an azo group, the products being soluble in water and dyeing animal fibers black and varied tones of brown, red and violet colors of good to excellent fastness, containing at least one metal taken from the group consisting of iron, manganese, vanadium, titanium, zirconium.

6. As new products, metallized dyes derived from ortho-hydroxyphenyl azo-naphthol sulfonic acids having a pair of OH groups ortho to the azo group, the products being soluble in water and dyeing animal fibers from an acid bath varied tones of red to brown colors of excellent fastness, containing iron.

7. As a new product, the iron compound of the dye of the general formula—

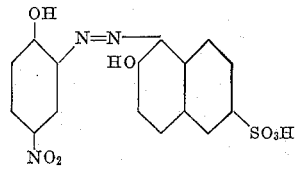

which is soluble in water and dyes animal fibers a dark tone of brown of excellent fastness.

MOSES LEVEROCK CROSSLEY.
LINCOLN M. SHAFER.